Patented July 7, 1936

2,046,880

UNITED STATES PATENT OFFICE 2,046,880

COLLOIDAL SULPHUR AND PROCESS OF PRODUCING THE SAME

Irving Miller, Medford, Oreg., assignor of one-fifth to Royal Miller, one-fifth to Claude Coffing, both of Sacramento, Calif., and one-fifth to Ralph E. Sanborn, San Francisco, Calif.

No Drawing. Application August 28, 1933, Serial No. 687,171

15 Claims. (Cl. 23—224)

This invention relates to colloidal sulphur and to a process of producing the same.

Colloidal sulphur is a variety of sulphur that in consequence of the special treatment it has received readily dissolves in water to form a colloidal solution. Since the term colloidal is frequently loosely used, it becomes necessary to define the term "colloidal sulphur" as it is used in this application.

By the term "colloidal sulphur" in this application, I refer to sulphur consisting of such finely divided particles that when such sulphur is dispersed in water it forms a highly dispersed colloidal solution, clear by transmitted light and slightly fluorescent by reflected light. In this sense colloidal sulphur consists of particles which are generally invisible in the ultramicroscope, although as a solution of the colloidal sulphur ages some particles become visible ultramicroscopically. I thus distinguish colloidal sulphur proper from other so-called colloidal sulphurs, which, in fact, are not truly colloidal but in which the particles are more coarsely dispersed, forming opaque solutions.

The activity of sulphur depends largely on its state of sub-division. For example, ordinary sulphur is fairly inert and may be introduced into the human body in large quantities without producing any marked effects. Precipitated sulphur, which is in a finer state of sub-division than the ordinary variety, is more active and hence this material finds application as an ingredient of sulphur ointments. Colloidal sulphur solutions, as herein defined, are very active and have been found to possess important curative powers. For example, ordinary sulphur is fairly inert and may be introduced into the body in large quantities without producing any marked effects. Precipitated sulphur, which is in a finer state of subdivision than the ordinary variety, is more active and this activity is taken advantage of in preparing sulphur ointments; milky suspensions of sulphur, in which the sulphur is still more finely divided, are yet more active and have been found to possess remarkable curative powers; finally colloidal sulphur solutions possess the very maximum of activity, upon which fact depend the many useful applications of these colloidal sulphurs.

Heretofore, if colloidal sulphur has been produced it has been produced only in such small quantities as to be merely a scientific curiosity or to furnish material for the study of the action of colloids.

It is the general object of the present invention to provide a process of producing colloidal sulphur which will permit the production of colloidal sulphur solutions in large and useful quantities.

It is a further object of the present invention to provide a number of new products, including a new form of colloidal sulphur itself.

The present invention, together with various objects and advantages thereof, will best be understood from a description of a preferred form or example of a process and product embodying the invention. For this purpose, I have hereinafter described a preferred product and a preferred process of producing the same.

In the preferred process the colloidal sulphur itself is produced by a reaction between concentrated sulphuric acid and sodium thiosulphate. It is understood, of course, that other equivalent alkaline thiosulphates, such as potassium thiosulphate, might be substituted in the process. The reaction taking place between these ingredients proceeds with the formation of sodium sulphate, sulphur dioxide and water in accordance with the following equation:

$$Na_2S_2O_3 + H_2SO_4 = Na_2SO_4 + S + SO_2 + H_2O$$

The sulphur produced from this reaction is the sulphur which is in the colloidal state. In order that a material portion of the sulphur be derived in the colloidal state, it is important that the reaction be carefully controlled and regulated. In the preferred process, I prefer to start with a bulky supply of concentrated sulphuric acid and add the sodium thiosulphate solution thereto slowly under carefully regulated conditions of temperature and rate of addition of thiosulphate solution. It is to be noted that it is essential to the production of colloidal sulphur that the thiosulphate solution be added to the bulk supply of concentrated sulphuric acid, as the addition of concentrated sulphuric acid to a bulk supply of sodium thiosulphate solution does not produce colloidal sulphur but merely precipitated sulphur. The sodium thiosulphate solution most desirable is at a concentration of about 745 grams of thiosulphate per liter of solution. About 1200 m. l. of the foregoing sodium thiosulphate solution are employed to about 500 m. l. of concentrated commercial sulphuric acid.

In the preferred process, the bulk supply of the sulphuric acid solution is first placed in a vessel and surrounded by suitable means for controlling the temperature thereof. In certain cases, it may be sufficient to merely surround the container at the start of the process by ice.

Provision should be made for the removal of the sulphur dioxide gas, which is generated continuously in the process, and also provision should be made for thoroughly agitating the thiosulphate solution during the process. For this purpose, any suitable agitating means, such as a mechanical stirrer, may be employed. The sodium thiosulphate solution is added slowly, for example, at the rate of two drops a second at the start of the reaction to the concentrated sulphuric acid while the same is stirred. In order to secure a maximum yield of sulphur in the colloidal state, a careful watch should be kept over the temperature which rises rapidly at the start of the reaction. When the temperature reaches 40° C., the rate of introduction of the thiosulphate solution is best regulated so that the reacting mixture is maintained between 40 and 50° C., although a few degrees above or below the limiting temperature momentarily is of no consequence. At other temperature ranges, if maintained during the process, the percentage of sulphur produced in the colloidal form is much lower or its quality is impaired. A high temperature produces high quality sulphur but in small quantity. A low temperature produces a lower quality of sulphur but a larger quantity.

After about ten to twenty minutes the temperature of the reacting mixture begins to drop, at which point the thiosulphate solution may be permitted to flow more rapidly, but it should not flow faster than the smallest possible continuous stream. The rate of addition of the thiosulphate solution should be so regulated that no foam forms sufficient to cover over the reacting mixture and prevent the thiosulphate solution from making immediate contact with it. During the later stages of the process it will be found necessary in order to keep the temperature from falling to remove the ice and water surrounding the container of the reacting mixture, and finally to provide heat to the reacting mixture, for example, by supplying hot water to the space surrounding the container of the reacting mixture. As soon as the addition of the thiosulphate solution has been completed, the reacting mixture is brought rapidly to 50° C. and stirred vigorously until the foam has disappeared from its surface. It is then diluted by the addition, for example, of about 400 m. l. of distilled water at 50° C.

At the completion of the reaction, without permitting the contents to drop below a temperature of substantially 45° C., the reacting mixture is filtered, for example, through cheese cloth, in order to remove that portion of the sulphur which is in an undissolved and non-colloidal state. It is important that this filtration be carried out at a temperature high enough to keep the soluble or colloidal sulphur from coagulating and clogging the filter.

By this process there is produced a solution of sodium sulphate with excess sulphuric acid present, possibly undecomposed sodium thiosulphate, various polythionic acids, and sulphur dioxide. It is now desired to separate the colloidal sulphur from these undesirable constituents and also to complete the separation of the colloidal sulphur from any sulphur which is in a non-colloidal condition. These results are best attained as follows:

A filtrate containing the colloidal sulphur is preferably permitted to refrigerate and settle for a period of about fifteen hours at a temperature which is preferably between 5° C. and 10° C. If a temperature below 5° C. is permitted, the whole mass becomes "mushy" and viscous, and if temperatures above 10° C. are permitted the sulphur will not be completely precipitated from the solution. This refrigeration and settling operation causes the colloidal sulphur in the solution to separate out and it is then filtered from the liquor. The coagulated sulphur thus separated is then redissolved by hot water, which preferably should be distilled water or soft water free from calcium, magnesium, and iron compounds, as the presence of these compounds is detrimental to the maintenance of the colloidal condition of the sulphur. For example, enough hot water is then added to the coagulated sulphur to bring the contents to a volume of about 750 m. l. By means of stirring and heating on a water bath to, for example, 50° C., the coagulated sulphur is all dissolved, with the exception of a small amount of very fine insoluble sulphur that gradually precipitates out. If it is noticed that the insoluble sulphur thus precipitated out is large in amount, it is preferable to refrigerate the solution to further settle out the insoluble sulphur.

After these operations, the colloidal or dissolved sulphur is now ready for purification. The purification operations preferably are conducted by alternately coagulating the same with saturated salt solution to free the sulphur from the impurities in its mother liquor, decanting the mother liquor, redissolving the solid sulphur, and repeating these operations until all undesirable impurities have been removed.

An important feature in the production of substantial amounts of colloidal sulphur in the purified state is a proper control of the temperature during these successive coagulations of the colloidal sulphur. For example, in the preferred process of purifying the colloidal sulphur the sulphur solution is brought to a temperature of about 50° C., and there is added about 300 m. l. of a saturated salt solution, which is likewise preferably at a temperature of 50° C. The result of the addition of the saturated salt solution is to coagulate and precipitate the colloidal sulphur. The admixture is preferably permitted to stand in a refrigerator for about fifteen hours, at which time the coagulated sulphur will have settled into a solid mass.

The liquor is then poured off the coagulated solid sulphur and the solid mass drained free of the liquid. The solid block of colloidal sulphur thus derived is then dissolved in warm distilled water and brought to a volume of about 500 m. l. It is again brought to 50° C. and a further quantity of salt solution at 50° C. added thereto, for example, 150 m. l. of salt solution is added, the mixture stirred and the sulphur again coagulated and precipitated in a mass, as before. The operations of permitting the mass to set again for fifteen hours and separating the solid sulphur derived from the liquor are repeated. These steps of alternately dissolving the solid sulphur in water and coagulating the sulphur with saturated salt solution are repeated one or more additional times, at the end of which time the solid sulphur resulting from one of the coagulating operations is redissolved in water at about 50° C. and then the solution permitted to settle in a refrigerator to in this manner completely coagulate the sulphur. The sulphur is separated from the remaining liquor and again dissolved in water to obtain about a 50% sulphur solution. This sulphur solution at the end of these operations contains about 10% common salt remaining from the concentrated salt solution used in the operations of coagulating the sulphur and separating it from the products of the original reaction. The sulphur solution thus obtained may be diluted to any desired extent with distilled water. A 10% solution of sulphur is the one which is found most useful in practice. To this sulphur solution there may be added a small amount of concentrated hydrochloric acid in order to improve the keeping properties thereof. For example, about two tenths of 1% of concentrated hydrochloric acid is added to the 50% sulphur solution before dilution.

It is also possible to remove some of the sodium chloride or electrolyte by dialysis, although it is not recommended that this be done for most purposes. To effect this, the concentrated sulphur solution may be placed in a parchment bag and dialysed against running distilled water for about three days. At the end the sulphur solution will be found to contain about 29% sulphur and about 1.9 of sodium salts.

I have also discovered that the colloidal sulphur solutions may be mixed with alcohol in various proportions. For many purposes, this alcoholic solution has an advantage over the purely aqueous solution. The alcoholic solutions are rendered more stable if a slight amount of hydrochloric acid is added, as in the case with the water solution. These alcoholic solutions also contain sodium chloride resulting from the coagulation operations. For example, I have produced most desirable solutions which include from 15% to 30% of alcohol, by volume, and about 5% to 10% colloidal sulphur.

In order to prepare stronger alcoholic solutions of colloidal sulphur, I discovered that the colloidal sulphur must be entirely freed from sodium chloride and this latter salt replaced by an acid. Although tartaric, citric, and other acids may be used for this purpose to some extent, I have found that concentrated hydrochloric acid is the only one that is entirely satisfactory. Sulphuric acid can not be used.

The process is as follows: To a very strong (50% or more) ordinary aqueous solution of colloidal sulphur with the usual amount of sodium chloride in it, is added a large excess of concentrated hydrochloric acid, the whole being surrounded by a freezing mixture of ice and salt. The sulphur is precipitated in a rubbery mass that after standing for 18 hours is compact enough to permit decantation of the supernatant liquid.

The coagulum of colloidal sulphur is well pressed to extract all the mother liquid possible, after which it is dissolved in a minimum quantity of water, and the whole operation of adding the hydrochloric acid, refrigeration, and so on, repeated. Another repetition of this operation completely replaces the salt with hydrochloric acid. The third residue will dissolve in either water or 95% alcohol and remains as stable as a chemically pure colloidal sulphur solution does.

With this sulphur-hydrochloric-acid sol., stable solutions containing 70% absolute alcohol by weight and up to 20% of colloidal sulphur may be prepared. The most useful of these alcoholic solutions I find to be those containing from 5% to 20% colloidal sulphur and from 30% to 60% absolute alcohol by weight.

While the particular form of product and process herein described are well adapted to carry out the objects of the present invention, various modifications and changes may be made without departing from the principles of the invention, and this invention includes all such modifications and changes as come within the scope of the appended claims.

I claim:

1. A process of producing a colloidal sulphur, which comprises adding a thiosulphate solution to a bulk supply of sulphuric acid so as to form sulphur in the colloidal condition, while maintaining the reaction temperature mainly between 40 and 50° C.

2. A process of producing a colloidal sulphur dispersion, which comprises adding a thiosulphate solution for a bulk supply of concentrated sulphuric acid to form sulphur in the colloidal state, and thereafter purifying the colloidal sulphur by coagulation of same through the addition of a substantially saturated sodium chloride solution, cooling, and settling and separating the coagulated sulphur from the mother liquor, and redispersing the coagulated sulphur.

3. A process of producing colloidal sulphur solution, which comprises adding to a bulk supply of concentrated sulphuric acid a thiosulphate solution at a regulated rate while stirring the concentrated sulphuric acid, and maintaining the temperature of the reaction mixture mainly between 40° and 50° C.

4. A process of producing colloidal sulphur solution, which comprises adding to a bulk supply of concentrated sulphuric acid a thiosulphate solution at a regulated rate while stirring the concentrated sulphuric acid, maintaining the temperature of the reaction mixture mainly between 40° and 50° C., and purifying the colloidal sulphur dispersion by coagulation of the colloidal sulphur by the addition of a concentrated salt solution, cooling, settling and separating the coagulated sulphur from the mother liquor, followed by dispersion of the coagulated sulphur.

5. A process of producing a colloidal sulphur dispersion, which comprises slowly adding to a bulk supply of concentrated sulphuric acid a thiosulphate solution to form sulphur in the colloidal state, and separating the colloidal sulphur from the reacting materials by coagulating the same with a substantially saturated solution of sodium chloride cooling, settling and separating the coagulated sulphur from the mother liquor, redispersing the coagulated sulphur, and subjecting the redispersed sulphur to one or more additional coagulations with saturated sodium chloride solutions.

6. A process of purifying a colloidal sulphur, which comprises adding a substantially saturated solution of sodium chloride to the colloidal sulphur dispersion at a temperature of about 50° C. and then cooling the admixed solution to a temperature of about 0° C. suitable for coagulating the sulphur, separating the solvent from the coagulated sulphur and redispersing the coagulated sulphur in water.

7. A process of purifying a colloidal sulphur, which comprises dispersing colloidal sulphur in water and heating to about 50° C., then adding a substantially saturated solution of sodium chloride to the colloidal sulphur dispersion, said solution of sodium chloride being likewise heated to about 50° C., and then cooling the admixed solution to a temperature of about 0° C. suitable for coagulating the sulphur, separating the solvent from the coagulated sulphur and redispersing the coagulated sulphur in water at a temperature of approximately 50° C.

8. A process of purifying a colloidal sulphur, which comprises bringing a dispersion of the colloidal sulphur to a temperature of about 50° C., then adding a substantially saturated solution of sodium chloride likewise at a temperature of about 50° C. to the colloidal sulphur dispersion and then cooling the admixed dispersion to a temperature of about 0° C., separating the solvent from the coagulated sulphur and redispersing the coagulated sulphur in water, and subjecting the redispersed colloidal sulphur to one or more additional like operations of coagulation and dispersion.

9. A process of purifying the colloidal sulphur which is dispersed in an aqueous vehicle, which comprises adding to such colloidal sulphur dispersion a substantially saturated solution of sodium chloride, both dispersion and solution being at approximately 50° C., then cooling the admixed dispersion and solution to a low temperature for several hours, removing the liquid from the coagulate, and redispersing the solid sulphur mass in distilled water or ordinary potable water free from salts of calcium, magnesium, iron and aluminum.

10. A process of purifying the colloidal sulphur which is dispersed in an aqueous vehicle, which comprises adding to such colloidal sulphur dispersion a substantially saturated solution of sodium chloride, both dispersion and solution being at approximately 50° C., then cooling the admixed dispersion and solution to a low temperature for several hours, removing the liquid from the coagulate, redispersing the solid sulphur mass in distilled water by heating on a water bath to substantially 50° C. and chilling for several hours or until the sulphur coagulates in a solid mass, and repeating the operation a second time.

11. As a new product, colloidal sulphur dispersed in a solvent comprising alcohol and water and containing a substantial amount of sodium chloride, and containing a small percentage of hydrochloric acid.

12. As a new product, colloidal sulphur dispersed in a solvent comprising ethyl alcohol up to 70% by weight and a smaller amount of water, and containing a small percentage of hydrochloric acid, but with no sodium chloride present.

13. A process of producing highly dispersable colloidal sulphur, which comprises adding a thiosulphate solution to a bulk supply of sulphuric acid in a fine stream while vigorously agitating the solution and maintaining the temperature between 40 and 50° C., thereafter filtering off the undispersed sulphur, allowing the liquid containing the colloidal sulphur to cool to a low temperature near 0° C. for a number of hours, and separating the coagulated colloidal sulphur from the mother liquor.

14. A process, as in claim 13, wherein the coagulated sulphur is dispersed in water at a temperature of about 50° C., and a substantially saturated solution of sodium chloride likewise at a temperature of 50° C. added thereto, the mixed solution and dispersion then being cooled to near 0° C. to re-coagulate the sulphur, and decanting the supernatant liquor and redispersing the coagulated sulphur in water.

15. A process of purifying colloidal sulphur dispersion produced from the reaction of thiosulphate on sulphuric acid, which comprises first subjecting the colloidal sulphur to one or more coagulations by the addition of salt and cooling followed by redispersion of the sulphur, and thereafter dispersing the colloidal sulphur in a minimum quantity of water at a temperature of about 50° C., and then without addition of coagulant allowing the dispersion to cool to a temperature of near 0° C., and removing the supernatant liquid, repeating the operation at least one additional time using substantially the minimum amount of water to dissolve the coagulant thereby purifying same from the salt used as a coagulant.

IRVING MILLER.